(12) United States Patent
Heier

(10) Patent No.: US 10,999,556 B2
(45) Date of Patent: *May 4, 2021

(54) SYSTEM AND METHOD OF VIDEO CAPTURE AND SEARCH OPTIMIZATION

(71) Applicant: Verint Americas Inc., Alpharetta, GA (US)

(72) Inventor: Kurt Heier, Westminster, CO (US)

(73) Assignee: Verint Americas Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/837,710

(22) Filed: Apr. 1, 2020

(65) Prior Publication Data

US 2020/0296332 A1 Sep. 17, 2020

Related U.S. Application Data

(63) Continuation of application No. 13/934,407, filed on Jul. 3, 2013, now Pat. No. 10,645,345.

(60) Provisional application No. 61/667,547, filed on Jul. 3, 2012.

(51) Int. Cl.
    *H04N 7/18* (2006.01)

(52) U.S. Cl.
    CPC .............. *H04N 7/18* (2013.01); *H04N 7/185* (2013.01)

(58) Field of Classification Search
    None
    See application file for complete search history.

(56) References Cited

U.S. PATENT DOCUMENTS

| | | | |
|---|---|---|---|
| 6,696,945 B1* | 2/2004 | Venetianer | G08B 13/19673 340/541 |
| 6,833,848 B1 | 12/2004 | Wolff | |
| 7,882,258 B1 | 2/2011 | Sumler | |
| 8,139,126 B2 | 3/2012 | Manico | |
| 2003/0020808 A1* | 1/2003 | Luke | G06T 7/20 348/47 |
| 2004/0105570 A1* | 6/2004 | Venetianer | G06T 7/80 382/100 |
| 2005/0185921 A1 | 8/2005 | Skran | |
| 2005/0273831 A1* | 12/2005 | Slomovich | H04N 7/181 725/105 |
| 2006/0059426 A1 | 3/2006 | Ogikubo | |
| 2006/0203090 A1* | 9/2006 | Wang | G08B 13/1963 348/143 |
| 2006/0248560 A1 | 11/2006 | Wada | |
| 2007/0127774 A1* | 6/2007 | Zhang | G08B 13/19602 382/103 |
| 2008/0100704 A1* | 5/2008 | Venetianer | G08B 29/188 348/143 |
| 2008/0144119 A1 | 6/2008 | Otake | |
| 2008/0232688 A1* | 9/2008 | Senior | G06K 9/6253 382/181 |
| 2008/0243774 A1* | 10/2008 | Jaspers | G06F 16/7837 |
| 2008/0272920 A1 | 11/2008 | Brown | |

(Continued)

*Primary Examiner* — Jayanti K Patel
*Assistant Examiner* — Stefan Gadomski
(74) *Attorney, Agent, or Firm* — ISUS Intellectual Property PLL; Anthony Jason Mirabito

(57) ABSTRACT

The system and method of the present application captures video of a scene in accordance with a plurality of capture characteristics, generates a capture profile for the video, and creates an index of the captured profile to enable a more rapid search of the captured video.

20 Claims, 4 Drawing Sheets

(56) References Cited

U.S. PATENT DOCUMENTS

| | | | |
|---|---|---|---|
| 2008/0297599 A1* | 12/2008 | Donovan | G11B 27/329 348/143 |
| 2009/0015671 A1* | 1/2009 | Addy | H04N 21/4223 348/143 |
| 2009/0033746 A1* | 2/2009 | Brown | G06K 9/209 348/155 |
| 2009/0219300 A1* | 9/2009 | Peleg | G06F 16/739 345/630 |
| 2009/0219387 A1 | 9/2009 | Marman | |
| 2010/0011297 A1* | 1/2010 | Tsai | G06F 16/743 715/721 |
| 2010/0013931 A1 | 1/2010 | Golan | |
| 2010/0026802 A1* | 2/2010 | Titus | G08B 13/19613 348/143 |
| 2010/0124356 A1* | 5/2010 | Hampapur | G06K 9/00778 382/103 |
| 2011/0001824 A1 | 1/2011 | Chang | |
| 2011/0013018 A1* | 1/2011 | Leblond | G08G 1/0175 348/143 |
| 2011/0311100 A1 | 12/2011 | Fan | |
| 2012/0042251 A1 | 2/2012 | Rodriguez | |
| 2012/0045090 A1* | 2/2012 | Bobbitt | G06T 7/74 382/103 |
| 2012/0062732 A1* | 3/2012 | Marman | G08B 13/19682 348/142 |
| 2012/0075475 A1* | 3/2012 | Mariadoss | G08B 13/2402 348/159 |
| 2012/0078899 A1 | 3/2012 | Fontana | |
| 2012/0086780 A1* | 4/2012 | Sharma | H04N 13/296 348/46 |
| 2012/0117089 A1 | 5/2012 | Matrat | |
| 2012/0162251 A1 | 6/2012 | Minamino | |
| 2012/0176525 A1 | 7/2012 | Garin | |
| 2012/0200409 A1 | 8/2012 | Hill | |
| 2013/0039634 A1* | 2/2013 | M | G08B 13/19682 386/230 |
| 2013/0144968 A1 | 6/2013 | Berger | |
| 2013/0147980 A1 | 6/2013 | Gardenfors | |
| 2013/0201338 A1* | 8/2013 | Westmacott | H04N 7/188 348/159 |
| 2014/0119594 A1 | 5/2014 | Chou | |
| 2014/0376876 A1 | 12/2014 | Bentley | |

* cited by examiner

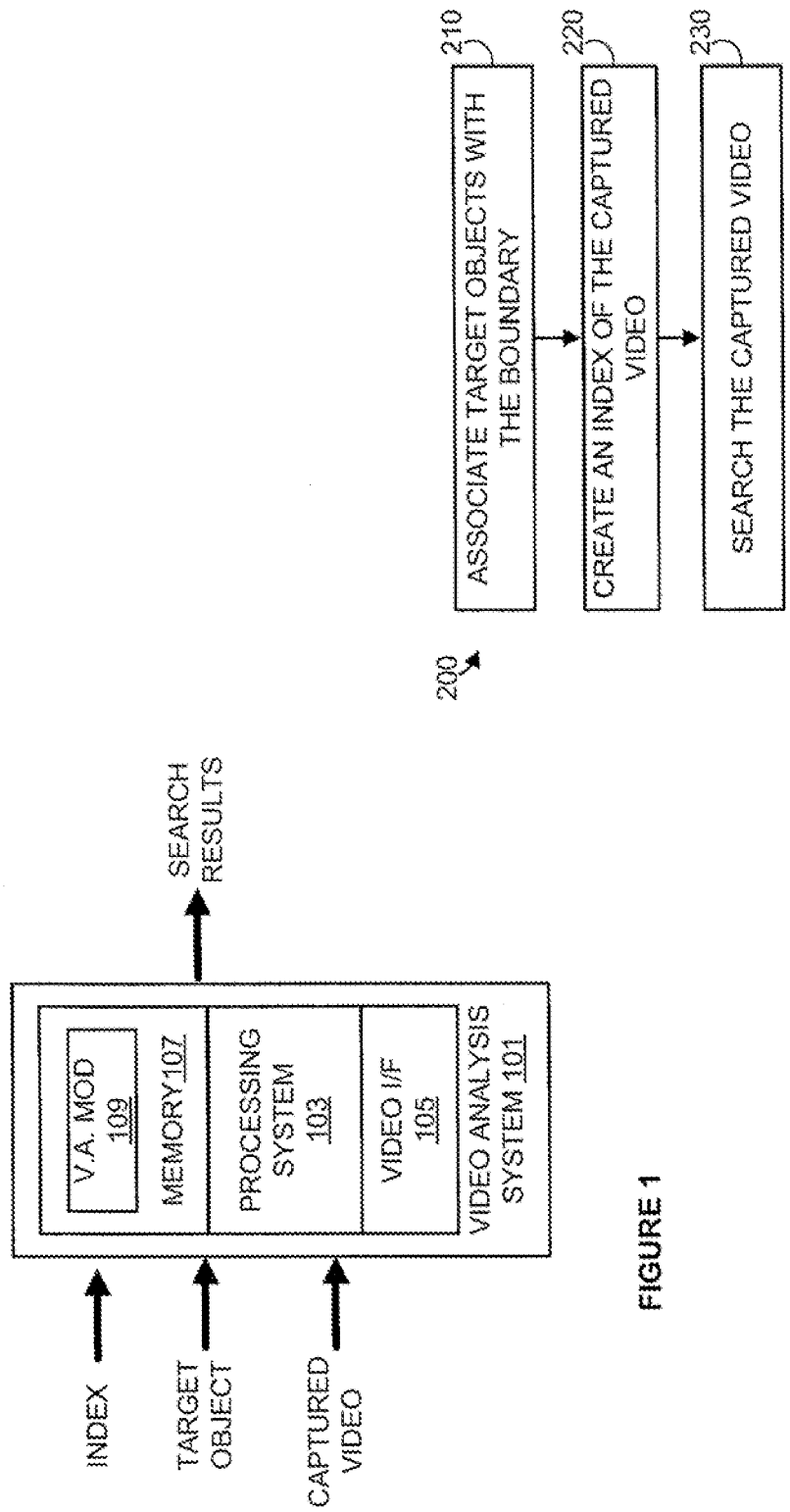

SYSTEM AND METHOD OF VIDEO CAPTURE AND SEARCH OPTIMIZATION

CROSS REFERENCE TO RELATED APPLICATIONS

The present application is a continuation of U.S. application Ser. No. 13/934,407, filed Jul. 3, 2013, which application claims priority of U.S. Provisional Patent Application No. 61/667,547, filed Jul. 3, 2012, the contents of which are incorporated herein by reference in their entireties.

FIELD OF THE DISCLOSURE

The present application is related to the field of video display and management systems, and in particular, to optimizing the searching of surveillance video.

TECHNICAL BACKGROUND

Effective video surveillance requires high quality images that can be viewed, searched, and analyzed. In many circumstances, images for people who are and were in an area may need to be known and identified, for viewing, searching and analyzing. Such video is often taken of various areas, and searching volumes of this video for particular individuals may be time consuming.

SUMMARY

The system and method of the present application captures video of a scene in accordance with a plurality of capture characteristics, generates a capture profile for the video, and creates an index of the captured profile to enable a more rapid search of the captured video.

In one embodiment, a non-transitory computer readable medium has stored thereon instructions for optimizing video surveillance that, when executed by a video system, direct the video system to identify a boundary in a scene, capture video of the scene, wherein the scene comprises objects, associate target objects with the boundary, create an index of the captured video, and search the captured video for the target objects based at least in part on the index.

In another embodiment, a computerized method of optimizing video surveillance comprises identifying a boundary in an area, capturing video of the area including a target object, analyzing the captured video of a scene of the area to generate an index for the video when the target object is adjacent the boundary, and searching for the target object in the captured video based at least in part on the index.

In yet another embodiment, a system may be provided which includes a capture interface configured to capture video of a scene including a target object and a predefined boundary object, and a processing system coupled with the capture interface and configured to analyze the captured video of a scene of the area to generate an index for the video when the target object is adjacent the boundary, and searching for the target object in the captured video based at least in part on the index.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 1 illustrates a block diagram of an embodiment of a video analysis system of the present application;

FIG. 2 illustrates a flow diagram of an embodiment of a method of operation of a video analysis system of the present application;

DETAILED DESCRIPTION

Figure 3:
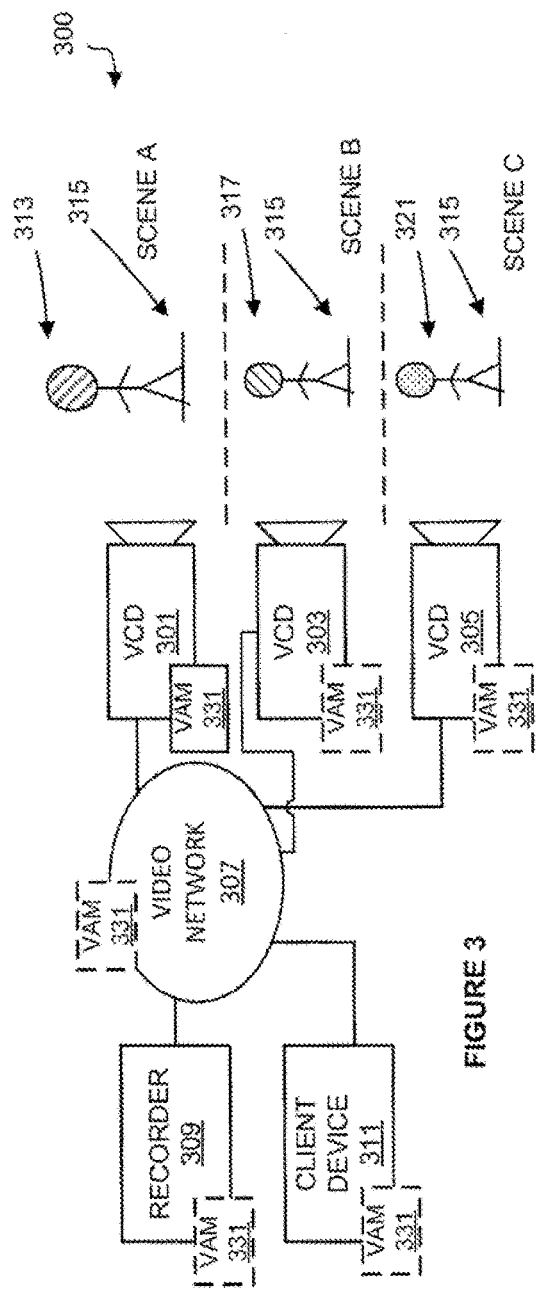
FIG. 3 illustrates a schematic diagram of an embodiment of a video surveillance environment of the present application.

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

FIG. 1 illustrates video analysis system 101. Video analysis system 101 includes processing system 103, video interface 105, memory 107, and video analysis module 109. Video analysis system 101 may be implemented in a number of ways, such as within or as part of a video recorder, a video camera, a client device, or as a stand-alone system. Video analysis system 101 operates as further described below to monitor and maintain the quality of captured video in surveillance settings. It should be noted that the processing system 103 of FIG. 1 is capable of executing computer software and/or code in order to effectuate the operation of the system 101, and any other processor method disclosed m this application.

Referring to FIG. 2, process 200 is shown. Process 200 describes the operation of video analysis system 101. To begin, processing system 103 associates a target object with a boundary (step 210). The boundary may be defined by a user through the system. The boundary may be a vertical or horizontal straight line placed over the scene captured by the camera, or may be a curved or other line defined by a user through a user interface. The boundary may be an area in a scene or room, such that a video camera may capture a clear image of a face of a person in the scene. The face shot, head shot, or other shot may be the target object. The target object may therefore be any defined object, as defined by a user in the scene.

When a person crosses the boundary, processing system 103 may index where in the captured video the target object (e.g. face shot) is located. Later when face shots are queried by a user, the system can quickly search for all of the captured target objects (face shots). This greatly reduce the time needed to search the captured video for identification of persons who are or were in the area. If the target object is not found in the search of the indexed captured video, the rest of the captured video may be searched.

Processing system 103 may obtain or otherwise access the video by way of video interface 105, which itself may interface to a variety of video sources, such as a camera feed, stored video, or other video sources.

Next, processing system 103 creates an index of the captured video (step 220). The index may be the portion of the captured video where a clear face shot is present within the scene captured.

Finally, processing system 103 searches the captured video, and using the index, can quickly search the captured videos to identify people who are or were in the area (step 230). It should be noted that the system and method of the present application is not by itself a face recognition application, but a system and method that will index target objects (in this case face shots) for identification by another or another system. Of course, such a face recognition system could indeed be utilized in conjunction with, or be added to, the system and method of the present application. This may be performed in any number of ways, depending upon how video analysis system 101 is deployed.

FIG. 3 illustrates video surveillance environment 300 in another embodiment. Video surveillance environment 300 includes video capture device (VCD) 301, VCD 303, and VCD 305. VCDs 301, 303 and 305 communicate over video network 307 with recorder 309 and client device 311. As shown, VCD 301 generally captures video of scene A, which includes target object 313 and object 315. Likewise, VCD 303 generally captures video of scene B, which includes target object 317 and object 315. VCD 305 captures video of scene C, which includes target object 321 and object 315.

VCD 301 is shown with video analysis module (VAM) 331, the operation of which will be described in more detail below with respect to FIG. 3. VAM 331 is capable of associating target object 313, 317, 321 with the boundary object 315 and creating an indication where within the captured video the target object is shown. VAM 331 is capable of searching the captured video quickly, only searching the captured video that have target objects 313, 317, 321. In this manner, search times for face shots of people who are or were in the area may be greatly reduced.

It should be understood that VAM 331 could be implemented within VCD 303 and VCD 305, as well as within VCD 301. It should also be understood that similar video analysis modules could be implemented within other elements of video surveillance environment 300, such as with recorder 309, client device 311, within other element on video network 307 not shown, or as a stand-alone element. VAM 311 may be implemented as a software component, a hardware component, firmware, or any combination thereof.

Client device 311 may be capable of allowing a user to define the boundary. This is then used by VAM 331, such that when a person crosses the boundary, the general position or time within the captured video where this took place can be indexed and analyzed. VAM 331 may then search the captured video, in this example, stored on recorder 309 to quickly find a target object 313, 317, 321.

Referring again to FIG. 4, a graphical depiction of the operation of VAM 331 is provided. Only a single video analysis module is shown handling video of scenes A, B, and C, although it should be understood that, depending upon the chosen architecture, multiple video analysis modules 331 may be involved.

Figure 4:
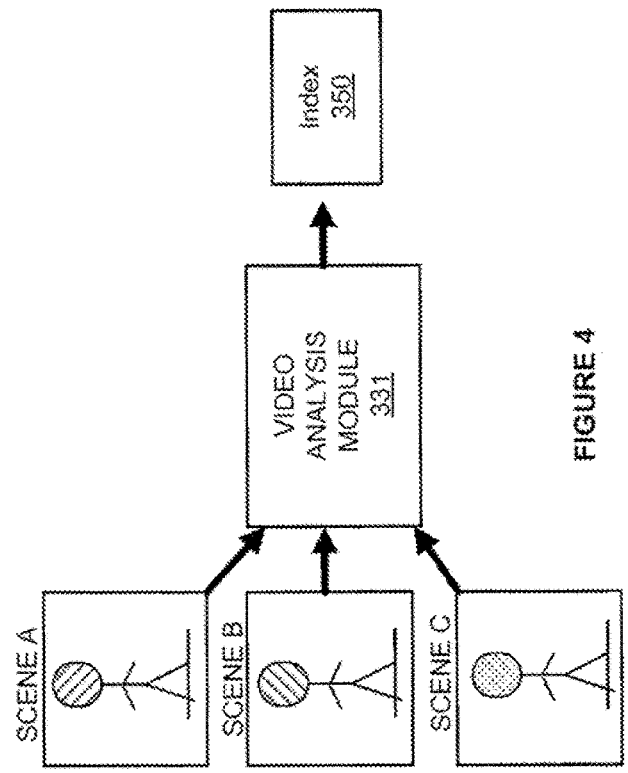
FIG. 4 illustrates a flow diagram of an embodiment of a method of operation of a video analysis module of the present application.

Continuing with FIG. 4, VAM 331 receives video of scenes A, B, and C. As shown to the left of VAM 331, the video initially video captured by VCD 301 of scene A includes objects 313 and 315. VAM 331 generates an index 350 or any other indication that an object (a person) is adjacent or has crossed another object 315 (the boundary). VAM 331 may then associate the objects, and create an index 350 or list or other notation of where a search may find a relatively good image of the objects.

Still referring to FIG. 4, VAM 331 produces results similar to those of scene A respect to scene B and scene C when the same operations are performed. As shown to the left of VAM 331, objects 317 and 321 represent different persons. The location in the captured video when the person crossed the boundary is noted for faster searching later when needed or desired.

Figure 5:
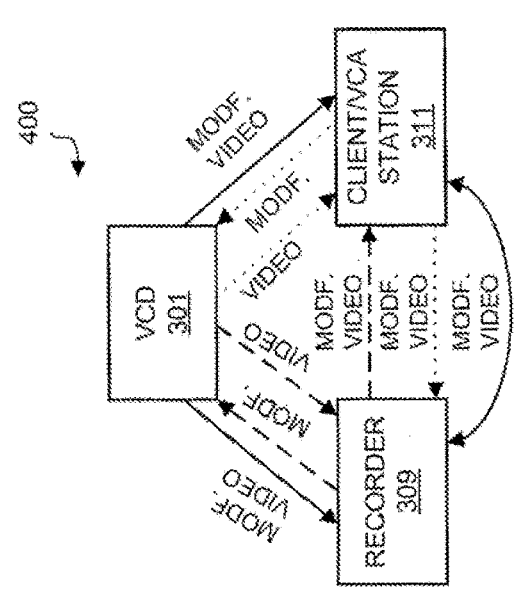
FIG. 5 illustrates a flow diagram of an embodiment of operations in a surveillance environment.

FIG. 5 illustrates several different implementations, each an example of a deployment of VAM 331, Various data flows are described relating to the various implementations of VAM 331. It should be understood that FIG. 5 is merely illustrative and non-limiting and does not encompass all the possible, deployments of VAM 331.

In the first implementation represented by the solid line, VAM 331 is implemented in VCD 301. It should be understood this example could apply as well to VCD 303 and VCD 305. In this situation, VCD 301 executes VAM 331 to associate potential target objects 313, 317, 319 with a boundary 315, note where in the captured video that occurs, and be capable of relatively rapidly searching the captured video for a target object. After searching, the target object(s) 313, 317, 319 may be displayed on client station 311, The captured video to be searched may resides on recorder 309 or any other location capable of performing that function.

As represented by the dashed line in FIG. 5, VAM 331 could also be implemented in recorder 309. In this case, unmodified video is initially transferred from VCD 301 to recorder 309. An an alternative, recorder 309 could implement the analyzing and indexing itself, as opposed to instructing VCD 301 to make the modifications. In a final example, VAM 311 is implemented in client device 311, as represented by the dotted lines. In this case, unmodified video is initially transferred from VCD 301 to client device 311.

Figure 6:
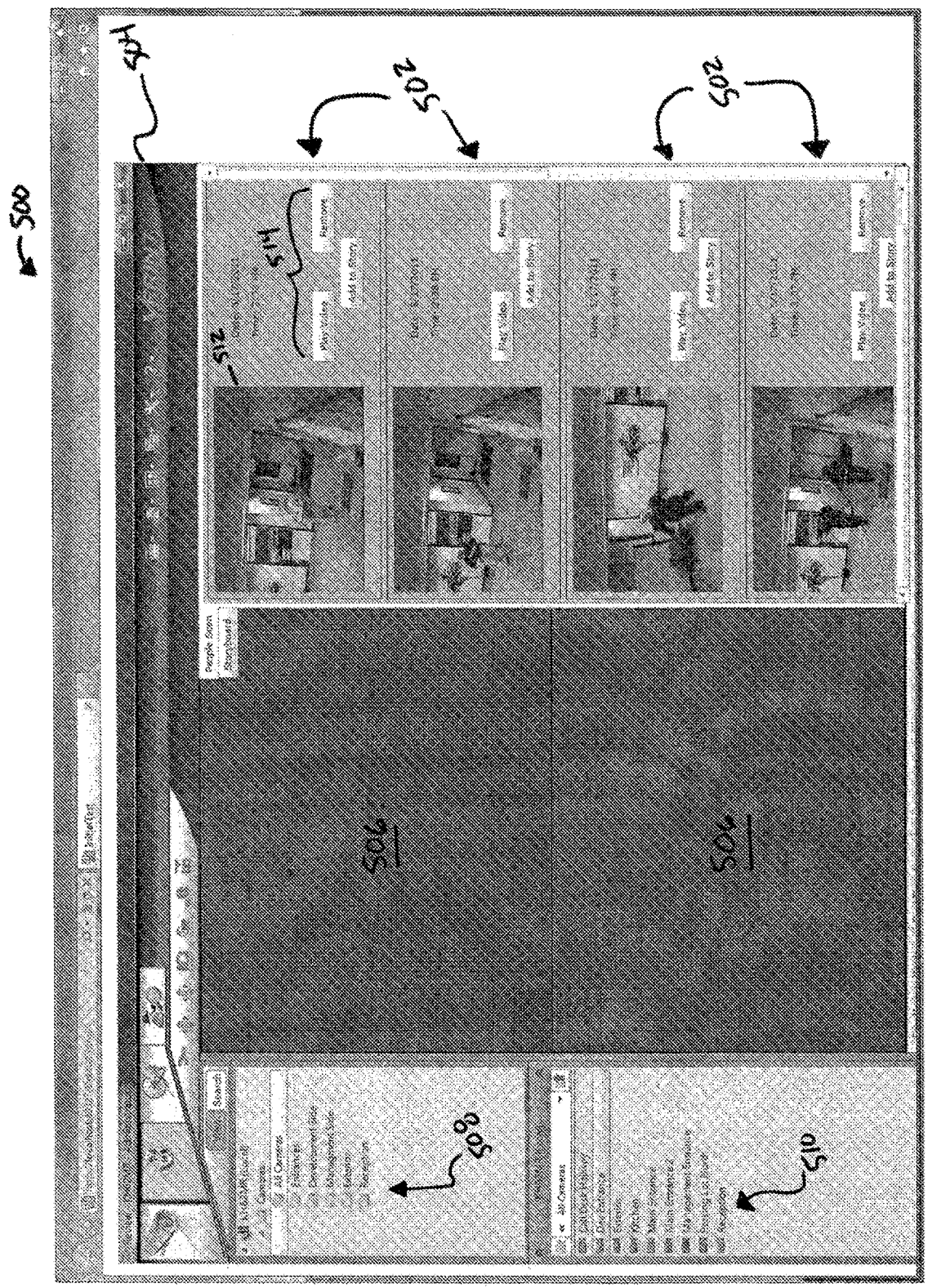
FIG. 6 illustrates a graphical user interface of an embodiment of the present application.
Figure 7:
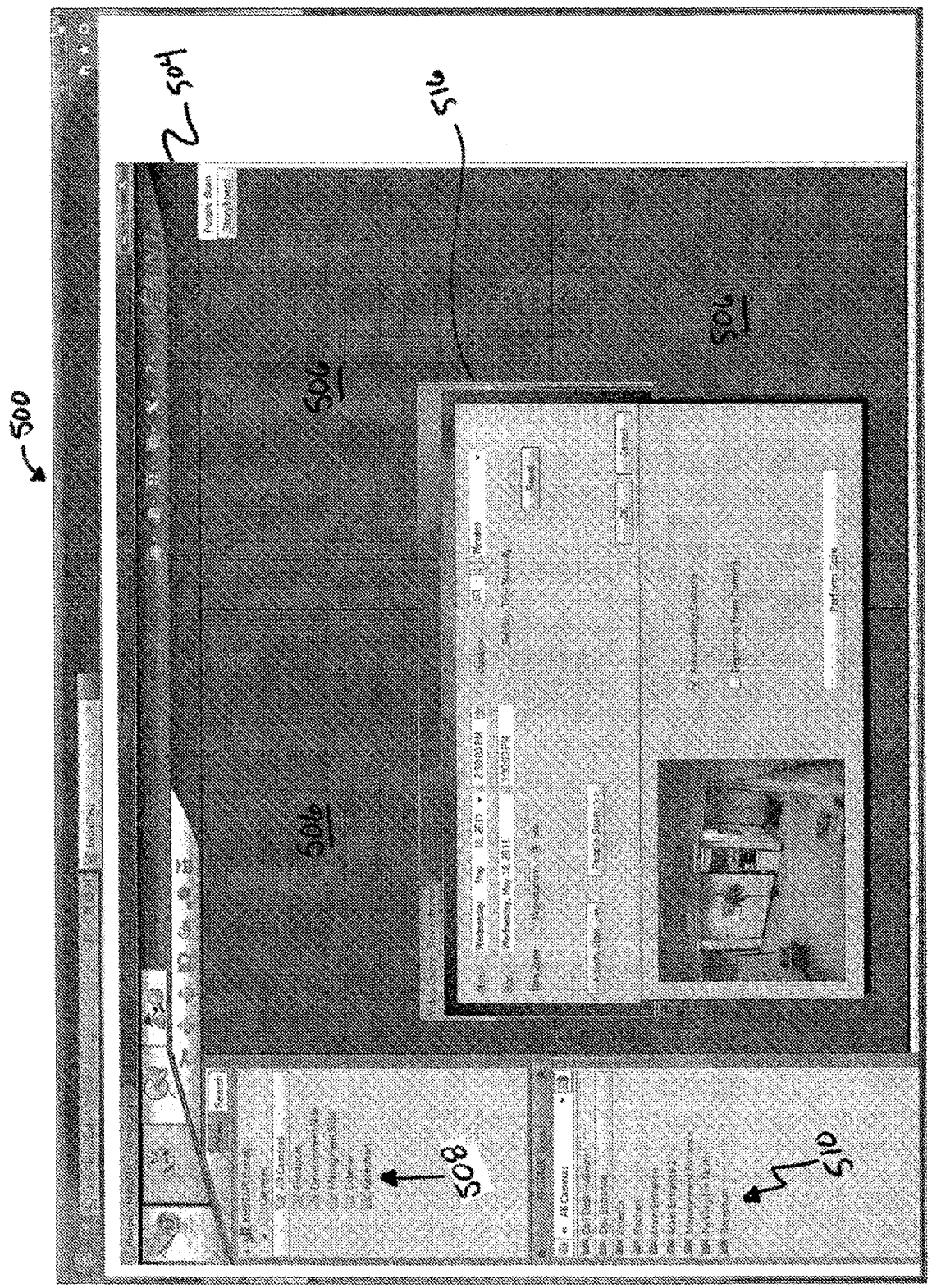
FIG. 7 illustrates a graphical user interface of an embodiment of the present application.

Referring now both to FIGS. 6 and 7, a graphical user interface (GUI) 500 is illustrated. It should be noted that this GUI 500 is exemplary of the system and method of the present application, and that other embodiments and screen shots could also be utilized to illustrate the workings of the system and method of the present application. Here, an exemplary image search screen 504 is illustrated including index images 502 from the system and method described above. These indexed images 502 include both the indexed image 512 as well as selective buttons 514. FIG. 6 illustrates the results of an index search conducted by a user, resulting in the found indexed images 502. A user may utilize the selective buttons 514 in order to play the selected piece of video corresponding to the image 512, or to remove the image 512, or to add the image 512 to the storyboard 506. The user may do that with all of the indexed images 502 found in an index search. The storyboard 506 allows a user to collect a number of index images 502 and put them in order to follow a particular individual through a number of different indexed images 502, for example. The image search screen 504 also includes camera folders 508 that organize a large number of video capture devices and a camera list 510 for each of the camera folders 508. Referring specifically to FIG. 7, the image search screen 504 includes a search query menu 516 that allows the user to set a particular and specific set of search criteria that will produce the indexed images 502 of FIG. 6. Again, the search query menu 516 as well as the image search screen 504 generally, may be organized, embodied and/or implemented in a number of different ways, and the GUI 500 of FIGS. 6 and 7 are not intended to be limiting to this particular embodiment.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for searching video collected by a video surveillance system, the method comprising:
    providing the video surveillance system, wherein the video surveillance system includes a video analysis system, at least one video capture device, a user interface, and a display, wherein the at least one video capture device is operably connected to the video analysis system and the video analysis system is connected to the display, wherein the video analysis system includes a processing system, a video interface, a memory, and a video analysis module;
    capturing a video of a scene with the at least one video capture device, wherein the scene comprises objects;
    receiving the captured video from the at least one video capture device at the video analysis system;
    receiving at least one user-defined target object at the video analysis system;
    receiving a user-defined boundary at the video analysis system, the user-defined boundary separating areas in the scene;
    associating, by the video analysis system, the at least one user-defined target object with the user-defined boundary, wherein a location of the target object in the captured video is determined;
    determining, by the video analysis system, a set of times in the captured video when any of the user-defined target objects cross the user-defined boundary;
    creating an index of the captured video by the video analysis system, based on the determined set of times in the captured video when at least one of the user-defined target objects crosses the user-defined boundary;
    searching, by the video analysis system, the index of the captured video for one of the user-defined target objects to present a set of images in the user interface that is representative of a scene containing the searched for user-defined target object;
    transmitting each image of the set of images to a display; and
    displaying each image of the set of images through the user interface on the display.

2. The method of claim 1, the method comprising displaying a storyboard through the user interface on the display.

3. The method of claim 2, the method comprising displaying, for each image of the set of images, a plurality of graphic buttons through the user interface on the display adjacent to each image of the set of images.

4. The method of claim 3, wherein the plurality of buttons includes at least one of a button for removal of at least one displayed image, a button for playing the scene represented by at least one displayed image, or a button for adding at least one displayed image to the storyboard.

5. The method of claim 3, the method comprising receiving, by the video analysis system, a user input from at least one of the plurality of buttons for at least one image of the set of images.

6. The method of claim 1, wherein the user-defined target object is any face, head, or person.

7. The method of claim 1, wherein the video surveillance system comprises a plurality of video capture devices.

8. The method of claim 1, the method further comprising if the index search returns no images of the searched for user-defined target object, searching the captured video for the searched for user-defined target object to present a set of images in the user interface that is representative of a scene containing the searched for user-defined target object.

9. The method of claim 1, wherein the video analysis system is part of the at least one video capture device.

10. The method of claim 1, wherein the video surveillance system includes a client device, wherein the client device is operatively connected to the display, further wherein the video analysis system is part of the client device.

11. A video surveillance system for searching video, comprising:
    at least one video capture device, wherein the video capture device captures a video of a scene, wherein the scene comprises objects;
    a user interface incorporated into a video analysis system for receiving input from a user and displaying output from the video analysis system to a display;
    the display operatively connected to the video analysis system to display the user interface; and
    the video analysis system operatively connected to the at least one video capture device, the video analysis system including a processor that executes computer-readable instructions, which cause the processor to:
        receive the captured video from the at least one video capture device,
        receive at least one user-defined target object through the user interface,
        receive a user-defined boundary through the user interface, the user-defined boundary separating areas in the scene,
        associate the at least one user-defined target object with the user-defined boundary, wherein a location of the target object in the captured video is determined,
        determine a set of times in the captured video when any of the user-defined target objects cross the user-defined boundary, create an index of the captured video, based on the determined set of times in the captured video when at least one of the user-defined target objects crosses the user-defined boundary, receive, from the user interface, a request to search for one of the user-defined target objects, search the index of the captured video for the requested user-defined target object to present a set of images in the user interface that is representative of a scene containing the searched for user-defined target object transmit each image of the set of images to the display; and display each image of the set of images through the user interface on the display.

12. The system of claim 11, wherein the computer-readable instructions further cause the processor to display a storyboard through the user interface on the display.

13. The system of claim 12, wherein the computer-readable instructions further cause the processor to display, for each image of the set of images, a plurality of graphic buttons through the user interface on the display adjacent to each image of the set of images.

14. The system of claim 13, wherein the plurality of buttons includes at least one of a button for removal of at least one displayed image, a button for playing the scene represented by at least one displayed image, or a button for adding at least one displayed image to the storyboard.

15. The system of claim 13, wherein the computer-readable instructions further cause the processor to receive, through the user interface, a user input from at least one of the plurality of buttons for at least one image of the set of images.

16. The system of claim 11, wherein the user-defined target object is any face, head, or person.

17. The system of claim 11, further comprising a plurality of video capture devices.

18. The system of claim 11, wherein, if the index search returns no images of the searched for user-defined target object, the computer-readable instructions further cause the processor to search the captured video for the searched for user-defined target object to present a set of images in the user interface that is representative of a scene containing the searched for user-defined target object.

19. The system of claim 11, wherein the video analysis system is part of the at least one video capture device.

20. The system of claim 11, further comprising a client device, wherein the client device is operatively connected to the display, further wherein the video analysis system is part of the client device.

* * * * *